(12) United States Patent
Kishida

(10) Patent No.: US 10,150,477 B2
(45) Date of Patent: Dec. 11, 2018

(54) CONTROL DEVICE FOR VEHICLE

(71) Applicant: FUJI JUKOGYO KABUSHIKI KAISHA, Tokyo (JP)

(72) Inventor: Taichi Kishida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 36 days.

(21) Appl. No.: 15/395,319

(22) Filed: Dec. 30, 2016

(65) Prior Publication Data
US 2017/0253240 A1    Sep. 7, 2017

(30) Foreign Application Priority Data

Mar. 3, 2016    (JP) ................................. 2016-040918

(51) Int. Cl.
*B60W 30/16* (2012.01)
*B60W 50/08* (2012.01)
*B60K 6/48* (2007.10)
*B60W 50/00* (2006.01)

(52) U.S. Cl.
CPC .............. *B60W 30/162* (2013.01); *B60K 6/48* (2013.01); *B60W 30/16* (2013.01); *B60W 50/087* (2013.01); *B60K 2006/4808* (2013.01); *B60W 2050/0075* (2013.01); *B60W 2420/42* (2013.01); *B60W 2510/0638* (2013.01); *B60W 2540/10* (2013.01); *B60W 2540/103* (2013.01);
(Continued)

(58) Field of Classification Search
CPC ............... B60W 30/16; B60W 30/162; B60W 2540/10; B60W 2550/30; B60W 2550/308
See application file for complete search history.

(56) References Cited

U.S. PATENT DOCUMENTS

| 9,849,868 B2 * | 12/2017 | Sakaguchi | B60W 10/06 |
| 2003/0236624 A1 * | 12/2003 | Kimura | G08G 1/163 |
| | | | 701/301 |
| 2009/0164082 A1 | 6/2009 | Kobayashi et al. | |

(Continued)

FOREIGN PATENT DOCUMENTS

| JP | 2005-254857 A | 9/2005 |
| JP | 2008-087562 A | 4/2008 |
| JP | 2009-166824 A | 7/2009 |

OTHER PUBLICATIONS

Office Action received for Japanese Patent application No. 2016-040918, dated Aug. 1, 2017, 7 pages of office action and 15 pages of English translation.

*Primary Examiner* — Dale Moyer
(74) *Attorney, Agent, or Firm* — Chip Law Group

(57) ABSTRACT

A control device for a vehicle includes: an inter-vehicle distance detector that detects a presence or an absence of a preceding vehicle, and an inter-vehicle distance between the vehicle and the preceding vehicle; an effectiveness ratio setting module that sets an effectiveness ratio indicating a proportion of an accelerator operation amount of a driver to be reflected in a drive control, on the basis of the inter-vehicle distance when the inter-vehicle distance is less than a predetermined standard value; and a drive controller that performs the drive control on the vehicle on the basis of the effectiveness ratio. When the preceding vehicle goes away in a state in which the effectiveness ratio is lowered, the effectiveness ratio setting module gradually increases the effectiveness ratio for a period for which an accelerator is on.

9 Claims, 12 Drawing Sheets

(52) U.S. Cl.
CPC ... *B60W 2550/308* (2013.01); *B60W 2750/30* (2013.01); *Y02T 10/7258* (2013.01)

(56) References Cited

U.S. PATENT DOCUMENTS

2016/0214609 A1* 7/2016 Yamaoka .............. B60W 30/16
2018/0079405 A1* 3/2018 Gaither ................ B60W 30/02

\* cited by examiner

CONTROL DEVICE FOR VEHICLE

CROSS-REFERENCE TO RELATED APPLICATIONS

The present application claims priority from Japanese Patent Application No. 2016-040918 filed on Mar. 3, 2016, the entire contents of which are hereby incorporated by reference.

BACKGROUND

1. Technical Field

The present invention relates to a control device for a vehicle.

2. Related Art

A control device for a vehicle has been disclosed which performs control to change a characteristic of the driving force of a subject vehicle which is generated in response to an accelerator operation of the driver, on the basis of the traveling states of a preceding vehicle traveling ahead of the subject vehicle and the subject vehicle. For example, Japanese Unexamined Patent Application Publication (JP-A) No. 2008-87562 proposes a control device that, when the velocity of the subject vehicle is higher than the velocity of the preceding vehicle, makes the driving force of the subject vehicle generated in response to a driving force operation weaker than when the vehicle velocity of the subject vehicle is not higher than the vehicle velocity of the preceding vehicle.

When there is a preceding vehicle ahead of the subject vehicle, the control device described in JP-A No. 2008-87562 can correct an electronic throttle characteristic to suppress the driving force on the basis of the current inter-vehicle distance, the vehicle velocity of the subject vehicle, and the relative velocity of the preceding vehicle and the subject vehicle. Meanwhile, when the preceding vehicle goes away from the subject vehicle, the control device described in JP-A No. 2008-87562 performs control to restore the electronic throttle characteristic to the normal electronic throttle characteristic.

The control device described in JP-A No. 2008-87562 restores the electronic throttle characteristic to the normal electronic throttle characteristic soon, or more slowly and gradually by using a timer. It is possible that keeping the accelerator off for a while after the preceding vehicle goes away restores the electronic throttle characteristic to the normal characteristic by the time the accelerator is turned on again not only when the electronic throttle characteristic is restored to the normal characteristic soon, but also when the electronic throttle characteristic is gradually restored to the normal characteristic. If the driver steps on the accelerator in the same way as the last accelerator operation in this case, the vehicle would accelerate more than expected and consume more fuel.

SUMMARY OF THE INVENTION

It is desirable to provide a novel and improved control device for a vehicle which can prevent the vehicle from accelerating more than expected in response to an accelerator operation of the driver when the driving force suppression is cancelled, and prevent decrease in the energy consumption efficiency for generating the driving force of the vehicle.

An aspect of the present invention provides a control device for a vehicle, the control device including: an inter-vehicle distance detector that detects a presence or an absence of a preceding vehicle, and an inter-vehicle distance between the vehicle and the preceding vehicle; an effectiveness ratio setting module that sets an effectiveness ratio indicating a proportion of an accelerator operation amount to be reflected in a drive control, on the basis of the inter-vehicle distance when the inter-vehicle distance is less than a predetermined standard value; and a drive controller that performs the drive control on the vehicle on the basis of the effectiveness ratio. When the preceding vehicle goes away in a state in which the effectiveness ratio is lowered, the effectiveness ratio setting module gradually increases the effectiveness ratio for a period for which an accelerator is on.

The effectiveness ratio setting module may gradually increase the effectiveness ratio for a period for which the vehicle is accelerating.

An increase speed of the effectiveness ratio may vary in accordance with the accelerator operation amount.

The increase speed of the effectiveness ratio may increase with an increase in the accelerator operation amount.

When the accelerator operation amount exceeds a predetermined threshold, the effectiveness ratio setting module may set the effectiveness ratio at 100%.

After the preceding vehicle goes away in the state in which the effectiveness ratio is lowered, the effectiveness ratio setting module may retain the as-set effectiveness ratio for a predetermined time, and then gradually increase the effectiveness ratio.

The predetermined standard value of the inter-vehicle distance may be set in accordance with a velocity of the vehicle, and a relative velocity of the vehicle and the preceding vehicle.

The drive controller may reflect the effectiveness ratio in at least one of an actual accelerator opening degree, a target driving force, a target rotation speed of an engine, or a target acceleration, and perform the drive control.

DETAILED DESCRIPTION

Figure 1:
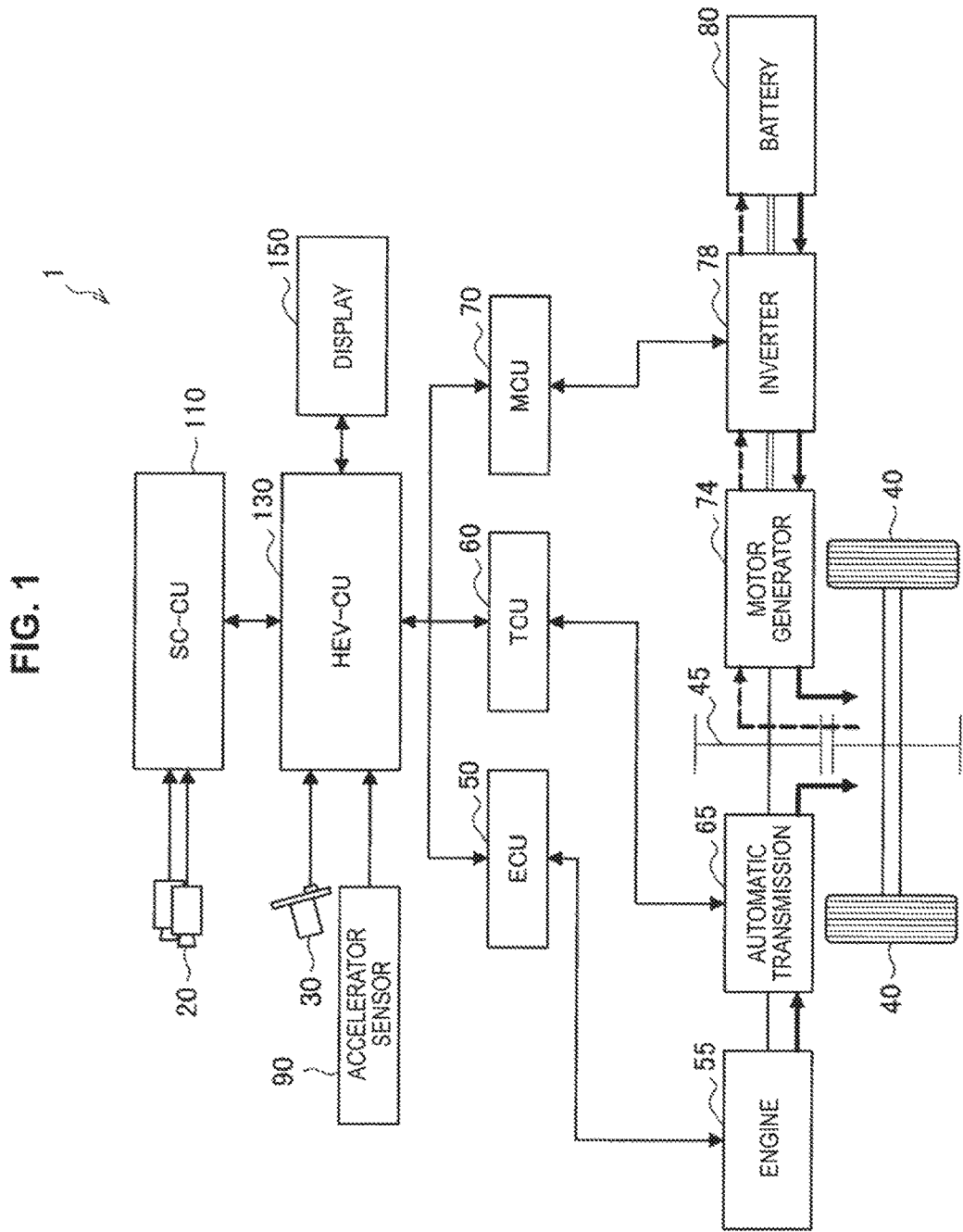
FIG. 1 is a block diagram illustrating a basic configuration of a vehicle according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

1. BASIC CONFIGURATION OF SYSTEM

<1-1. Basic Configuration Example of Power System>

First of all, the basic configuration of a power system in a vehicle system included in a control device for a vehicle according to an implementation of the present invention will be described with reference to FIG. 1. FIG. 1 schematically illustrates the basic system configuration of a vehicle (subject vehicle) 1 according to the present implementation. The vehicle 1 according to the present implementation is a hybrid vehicle (HEV) that includes an engine 55 and a motor generator 74 as the drive sources.

The engine 55 is an internal combustion engine that uses, for example, gasoline as fuel to generate driving force, and the output side of the engine 55 is coupled an automatic transmission 65. The automatic transmission 65 decreases the rotation speed of the engine 55 in accordance with the set gear ratio, and transmits the driving force output from the engine 55 to a drive shaft 45.

The motor generator 74 serves as a driving device that converts electrical energy into mechanical energy to generate the driving force of the vehicle 1, and as an electric power generator that converts mechanical energy into electrical energy to generate electric power. If the motor generator 74 serves as an electric power generator, the motor generator 74 has an electric power generation mode in which the electric power generated by the motor generator 74 driven by the power of the engine 55 is charged in the battery 80, and a regenerative brake mode in which the electric power generated by the motor generator 74 driven by the kinetic energy of the vehicle 1 at the time of deceleration is charged in the battery 80. The rotational force of driving wheels 40 drives the motor generator 74 to generate electric power, and brake force is also generated against the driving wheels 40 in the regenerative brake mode.

The motor generator 74 is coupled to the battery 80 via an inverter 78 that bidirectionally converts direct-current power and alternating-current power. If the motor generator 74 serves as a driving device, the inverter 78 converts the direct current supplied from the battery 80 into alternating current, and supplies the alternating current to the motor generator 74 to drive the motor generator 74. Meanwhile, if the motor generator 74 serves as an electric power generator, the inverter 78 converts the alternating current generated by the motor generator 74 into direct current, and charges the battery 80 with the direct current. In other words, the motor generator 74 can switch the operations under the control of the inverter 78.

The driving force output from the motor generator 74 is transmitted to the driving wheels 40 via a power transmission path including the drive shaft 45. Meanwhile, the driving force output from the engine 55 is transmitted to the driving wheels 40 via a power transmission path including the automatic transmission 65 and the drive shaft 45. There is provided a clutch (not illustrated) between the engine 55 and the automatic transmission 65. Disengaging the clutch decouples the engine 55 from the power transmission path, and couples only the motor generator 74 to the drive wheels 40 as the power source. Meanwhile, engaging the clutch couples the engine 55 to the power transmission path, and couples the engine 55 and the motor generator 74 to the driving wheels 40 as the power sources.

<1-2. Basic Configuration Example of Electronic Control System>

Next, the basic configuration of the electronic control system that controls the power system of the vehicle 1 will be described. As illustrated in FIG. 1, the electronic control system includes control units (CUs) that are coupled to a communication bus (not illustrated) such as a controller area network (CAN). The engine 55, the automatic transmission 65, and the motor generator 74 are controlled with coordination control via these control units. Additionally, the controller units that can be included in the control device for a vehicle may include a single control unit, or any number of control units.

In the present implementation, the control units include an engine control unit (which will also be referred to as "ECU") 50, a transmission control unit (which will also be referred to as "TCU") 60, a motor control unit (which will also be referred to as "MCU") 70, an imaging processing unit (which will also be referred to as "SC-CU") 110, and a hybrid control unit (which will also be referred to as "HEV-CU") 130. These control units can each include a microcomputer.

These control units 50, 60, 70, 110, and 130 mutually exchange control information such as various operation values and control parameter information detected by various sensors via an in-vehicle network made of the communication bus, and perform drive control such as controlling the engine, the motor, and the transmission.

The SC-CU 110 receives, for example, a signal of imaging information of the stereo camera assembly 20. For example, the SC-CU 110 detects a preceding vehicle, computes the inter-vehicle distance D between the subject vehicle 1 and the preceding vehicle, and computes the relative velocity Vd of the subject vehicle 1 and the preceding vehicle on the basis of the information on the images captured by the stereo camera assembly 20.

Meanwhile, the HEV-CU 130 receives signals from a control switch 30, an accelerator sensor 90 that detects an acceleration operation of the driver (how much the driver steps on the accelerator pedal or an actual accelerator opening degree), a brake sensor (not illustrated) that detects a brake operation (how much the driver steps on the brake pedal), and the like. The HEV-CU 130 receives information of a result of calculation performed by the SC-CU 110. The HEV-CU 130 is a control device that administers coordination control, performs calculation on the basis of various kinds of information to be acquired, and outputs control commands to the ECU 50, the TCU 60, and the MCU 70.

The HEV-CU 130 according to the present implementation uses the motor generator 74 to generate driving force, and drives the vehicle 1 if target torque is small and the charging rate of the battery 80 is sufficient. Meanwhile, the HEV-CU 130 starts the engine 55, uses the engine 55, or the engine 55 and the motor generator 74 to generate driving force, and drives the vehicle 1 if the target torque is large or the charging rate of the battery 80 is low. If the control switch 30 is on, the HEV-CU 130 sets the effectiveness ratio indicating the proportion of the accelerator operation amount of the driver to be reflected in the drive control on the basis of the inter-vehicle distance D, the relative velocity Vd, and the like computed by the SC-CU 110, and performs the drive control on the subject vehicle 1 on the basis of the effectiveness ratio. Additionally, the control switch 30 is provided, for example, to the steering wheel of the vehicle 1, and switched on or off by the driver.

The HEV-CU 130 according to the present implementation also generates a display signal for causing a display 150 to display various kinds of information. The display 150 may be a display inside an instrument panel, or a display device such as a liquid crystal panel that displays, for example, navigation information. Further, the display 150 may be a display device that uses a windshield as a display plane.

The ECU 50 controls the engine 55 on the basis of a control command from the HEV-CU 130. Specifically, the ECU 50 controls fuel injection quantity, fuel injection timing, ignition timing, an intake throttle valve opening degree, and the like, and uses the engine 55 to generate the driving force requested by the HEV-CU 130. In addition, the ECU 50 acquires sensor signals of a temperature sensor, a coolant temperature sensor, a rotation speed sensor, and the like included in the engine 55, and sends the sensor signals to the HEV-CU 130.

The TCU 60 controls the automatic transmission 65 on the basis of a control command from the HEV-CU 130. For example, if the automatic transmission 65 is a continuously variable automatic transmission, the TCU 60 controls the pulley width of a driving pulley and a driven pulley to control the ratio of the rotation speed of the driving pulley to the rotation speed of the driven pulley. In addition, the TCU 60 according to the present implementation controls the disengaging or engaging of the clutch mechanism (not illustrated) provided between the engine 55 and the automatic transmission 65.

The MCU 70 controls the inverter 78 on the basis of a control command from the HEV-CU 130. Specifically, if the motor generator 74 serves as a driving device, the MCU 70 controls the inverter 78 to convert the direct current supplied from the battery 80 into alternating current, and supplies the alternating current to the motor generator 74. Meanwhile, if the motor generator 74 serves as an electric power generator, the MCU 70 controls the inverter 78 to convert the alternating current generated by the motor generator 74 into direct current, and supplies the direct current to the battery 80.

In addition, the electronic control system may include a control unit other than the control units illustrated in FIG. 1. For example, the electronic control system may include a battery control unit that controls the temperature or charging of the battery 80. A display control unit that controls the display 150 may be included separately from the HEV-CU 130, and the HEV-CU 130 may send a display signal to the display control unit.

2. CONTROL DEVICE FOR VEHICLE

Next, the control device for a vehicle according to the present implementation will be described in detail. The following describes the overview of driving force suppression control to be executed by the control device for a vehicle according to the present implementation, and then a specific configuration example of the control device for a vehicle and control details.

<2-1. Overview of Driving Force Suppression Control>
(Normal Drive Control)

Figure 2:
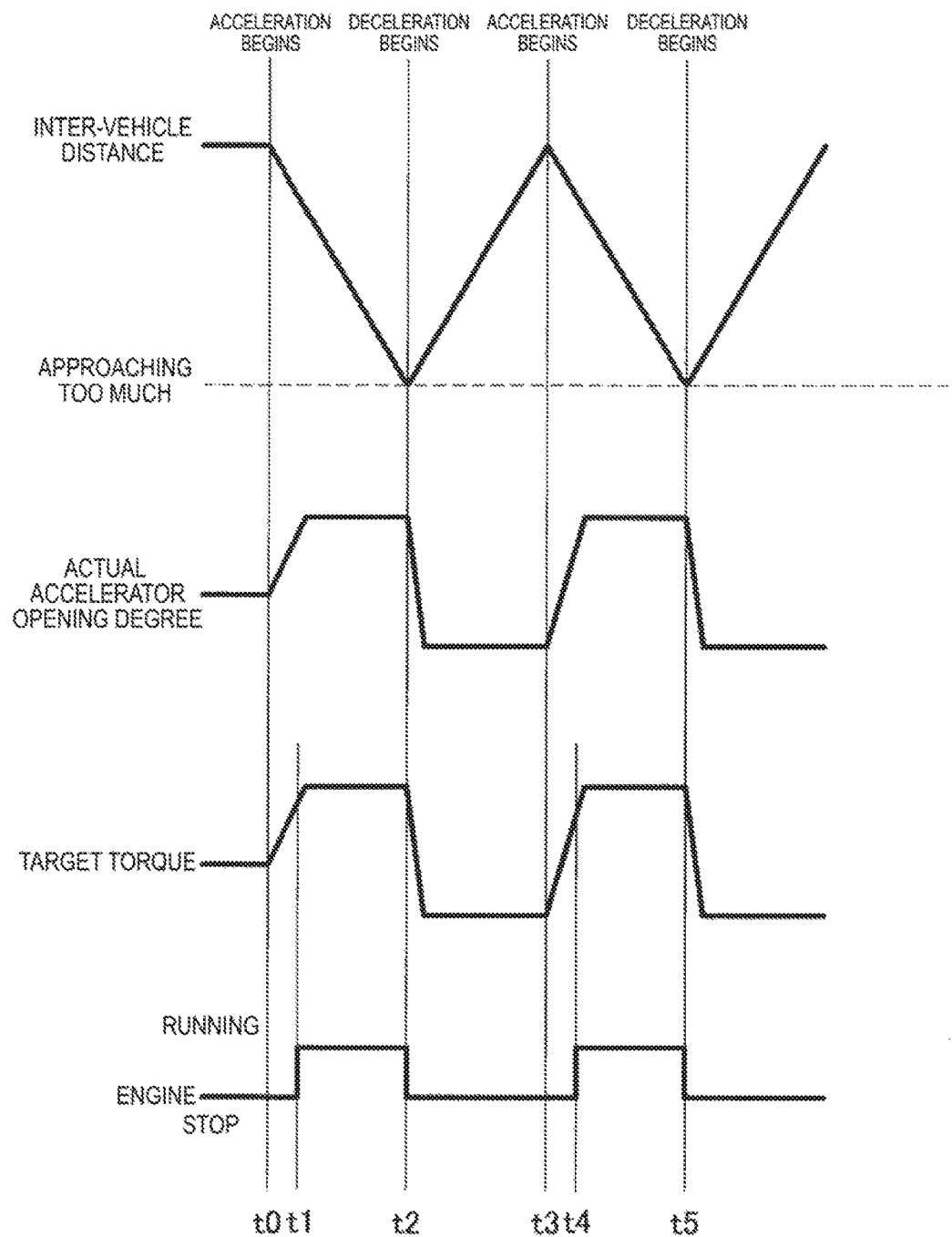
FIG. 2 is a time chart for describing an example in which driving force suppression control is off.

FIG. 2 is an explanatory diagram illustrating an example of the operation of the vehicle 1 illustrated in FIG. 1 with the control switch 30 of the vehicle 1 off. If the control switch 30 is off, the HEV-CU 130 performs normal drive control to directly (100%) reflect the accelerator operation amount of the driver.

Under the normal drive control, the accelerator operation amount of the driver is directly reflected in the drive control, and the HEV-CU 130 computes the target value (target torque) of the torque (the sum of the torque output from the engine 55 and transmitted to the driving wheels, and the torque output from the motor generator 74 and transmitted to the driving wheels) in accordance with the actual accelerator opening degree Acc. For example, as the actual accelerator opening degree Acc increases from time t0 in response to an accelerator operation of the driver as illustrated in FIG. 2, the target torque increases with increase in the actual accelerator opening degree Acc. Once the target torque increases and exceeds a predetermined setting value, the engine 55 starts (time t1).

When the vehicle 1 travels on a flat road, increase in the target torque leads to increase in the driving force of the vehicle 1 to accelerate the vehicle 1, and to decrease the inter-vehicle distance D to the preceding vehicle. As a result, depending on the driving skill of the driver, the subject vehicle 1 approaches the preceding vehicle so much that the subject vehicle 1 almost bumps against the preceding vehicle in some cases. The driver performs a brake operation or automatic brake control to avoid contact with the preceding vehicle in this case, and the subject vehicle 1 thus begins to decelerate (time t2). This decreases the target torque, and the engine 55 stops. If the subject vehicle 1 decelerates too much afterwards and the inter-vehicle distance D increases, the driver steps on the accelerator again to approach the preceding vehicle and the subject vehicle 1 begins to accelerate (time t3).

Once the target torque exceeds the predetermined setting value afterwards as described for the time t1 to the time t2, the engine 55 starts (time t4). When the subject vehicle 1 approaches the preceding vehicle too much, the subject vehicle 1 beings to decelerate again (time t5) and the engine 55 stops. For example, if the driver has an insufficient driving skill and difficulty in keeping an appropriate inter-vehicle distance, the vehicle 1 repeats acceleration and deceleration as discussed above. This would consequently decrease the fuel consumption efficiency of the engine 55 or the electric power consumption efficiency of the motor generator 74 as compared with driving with the inter-vehicle distance D kept appropriate.

(Driving Force Suppression Control)

Figure 3:
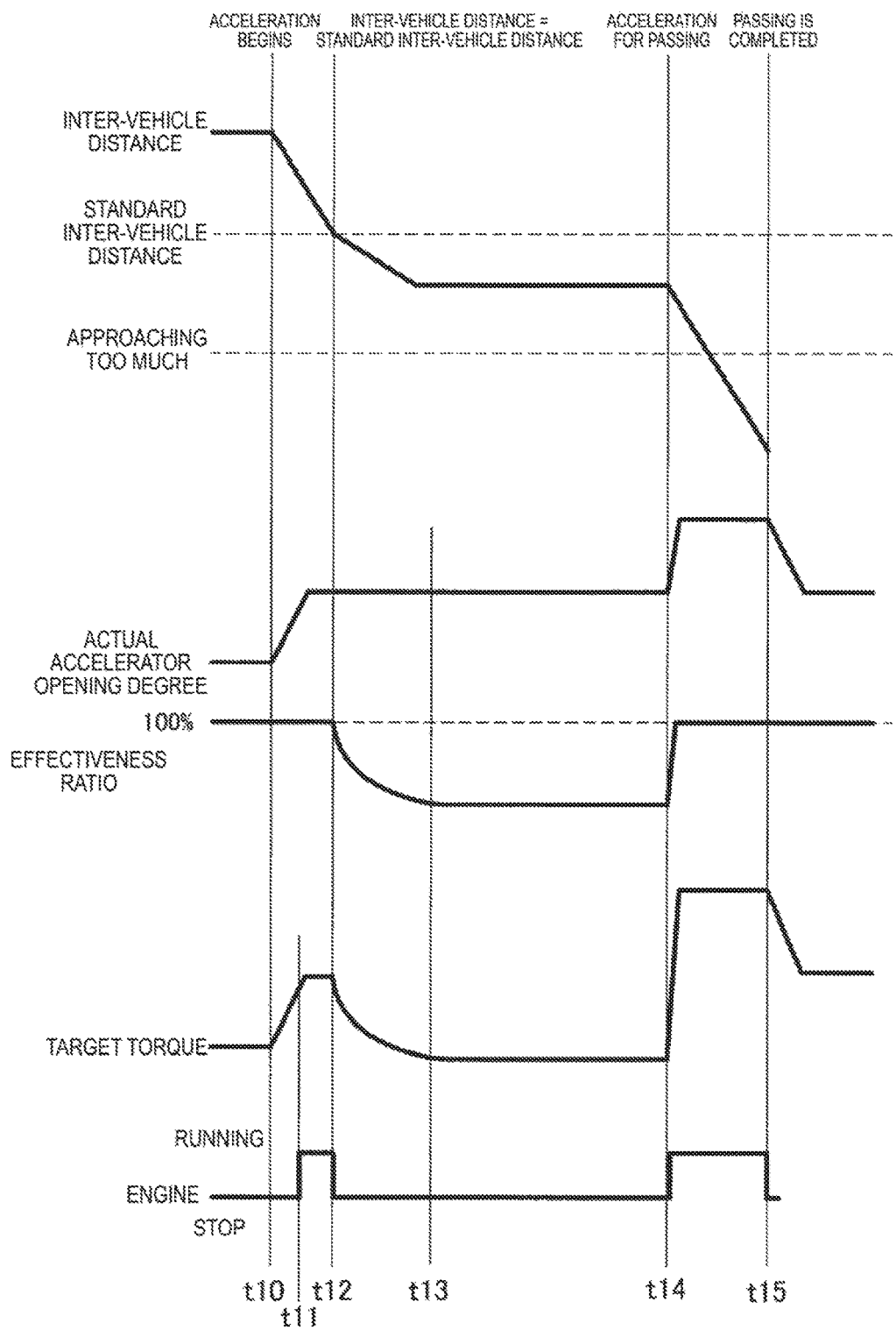
FIG. 3 is a time chart for describing an example of drive control processing according to the implementation.

FIG. 3 is an explanatory diagram illustrating an example of the operation of the vehicle 1 illustrated in FIG. 1 with the control switch 30 of the vehicle 1 on. If the control switch 30 is on, the HEV-CU 130 according to the present implementation sets an effectiveness ratio indicating the proportion of the accelerator operation amount of the driver to be reflected in the drive control when the inter-vehicle distance D between the subject vehicle 1 and the preceding vehicle falls below a predetermined standard value (standard inter-vehicle distance) Dstd, and controls the drive control on the vehicle 1 on the basis of the effectiveness ratio. The upper limit of the effectiveness ratio is set, for example, at 100%.

This can suppress the driving force of the vehicle 1 as compared with the normal drive control.

In the present implementation, the standard inter-vehicle distance Dstd is set in accordance with the velocity (which will also be referred to as "subject vehicle velocity") V of the subject vehicle 1 and the relative velocity (which will also be referred to simply as "relative velocity") Vd of the subject vehicle 1 and the preceding vehicle. Accordingly, the standard inter-vehicle distance Dstd is not necessarily constant. However, FIG. 3 takes an example in which the standard inter-vehicle distance Dstd is constant to facilitate understanding.

The HEV-CU 130 sets the standard inter-vehicle distance Dstd for beginning the driving force suppression control, on the basis of the subject vehicle velocity V and the relative velocity Vd. In addition, the HEV-CU 130 computes an inter-vehicle distance difference Ddiff obtained by subtracting the standard inter-vehicle distance Dstd from the inter-vehicle distance D between the preceding vehicle and the subject vehicle 1. Further, the HEV-CU 130 sets the effectiveness ratio at 100% if the inter-vehicle distance difference Ddiff is greater than or equal to 0 (if the inter-vehicle distance D is greater than or equal to the standard inter-vehicle distance Dstd). The HEV-CU 130 sets the effectiveness ratio below 100% if the inter-vehicle distance difference Ddiff is less than 0 (if the inter-vehicle distance D is less than the standard inter-vehicle distance Dstd). This suppresses the driving force of the subject vehicle 1 and prevents the subject vehicle 1 from approaching the preceding vehicle too much if the inter-vehicle distance D falls below the standard inter-vehicle distance Dstd.

Specifically, the HEV-CU 130 reflects the effectiveness ratio in the actual accelerator opening degree Acc to compute the control accelerator opening degree, and computes the target torque according to the control accelerator opening degree. For example, as the actual accelerator opening degree Acc increases from time t10 in response to an accelerator operation of the driver as illustrated in FIG. 3, the effectiveness ratio remains at 100% while the inter-vehicle distance D is greater than or equal to the standard inter-vehicle distance Dstd and the target torque increases with increase in the actual accelerator opening degree Acc. Once the target torque increases and exceeds a predetermined setting value, the engine 55 starts (time t11). When the vehicle 1 travels on a flat road, increase in the target torque can lead to increase in the driving force of the vehicle 1 to accelerate the vehicle 1, and to decrease the inter-vehicle distance D to the preceding vehicle.

If the inter-vehicle distance D between the subject vehicle 1 and the preceding vehicle still keeps on decreasing at time t12 after the inter-vehicle distance D come close to the standard inter-vehicle distance Dstd, the HEV-CU 130 sets the effectiveness ratio below 100%. The HEV-CU 130 may set a lower effectiveness ratio, for example, with decrease in the inter-vehicle distance D as discussed below (see FIG. 7). In the present implementation, the target torque changes in accordance with the control accelerator opening degree computed by multiplying the actual accelerator opening degree Acc by the effectiveness ratio. Accordingly, even if the actual accelerator opening degree Acc is constant, the target torque may change in accordance with a change in the effectiveness ratio for the period between the time t12 and time t13.

Once the effectiveness ratio is set below 100% and the driving force suppression control of the vehicle 1 begins, the subject vehicle 1 begins to decelerate (time t12). This can prevent the subject vehicle 1 from approaching the preceding vehicle too much for the period for which the driving force suppression control is executed. The subject vehicle 1 is thus prevented from repeating acceleration and deceleration.

If the driver clearly intends to accelerate, the HEV-CU 130 may cancel the driving force suppression control irrespective of the inter-vehicle distance D less than the standard inter-vehicle distance Dstd. For example, if the driver steps on the accelerator and accelerates the vehicle 1 to pass the preceding vehicle (time t14 to time t15) as illustrated in FIG. 3, the HEV-CU 130 may directly reflect the accelerator operation amount of the driver in the drive control by restoring the effectiveness ratio to 100%.

Figure 4:
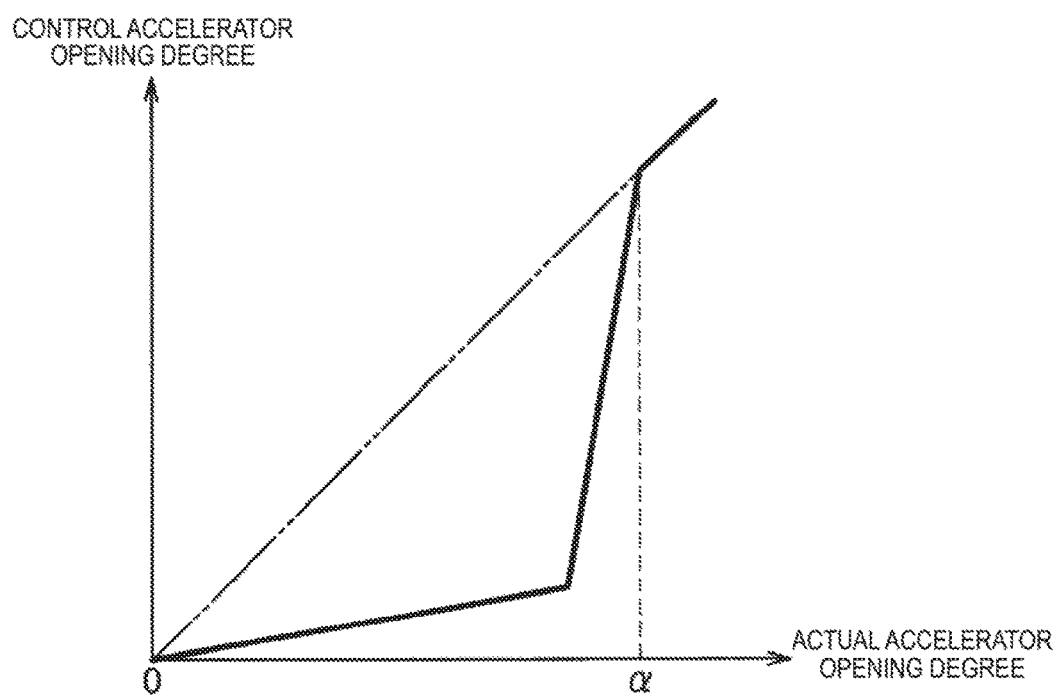
FIG. 4 is an explanatory diagram illustrating a relationship between an actual accelerator opening degree and a control accelerator opening degree.

FIG. 4 is an explanatory diagram illustrating a setting image of the control accelerator opening degree for canceling the driving force suppression control when the driver clearly intends to accelerate. In FIG. 4, the solid line illustrates an example of the relationship between the actual accelerator opening degree Acc and the control accelerator opening degree with the inter-vehicle distance D set below the standard inter-vehicle distance Dstd. Meanwhile, the two-dot chain line illustrates the relationship between the actual accelerator opening degree Acc and the control accelerator opening degree with the effectiveness ratio set at 100%.

For example, if the actual accelerator opening degree Acc is greater than or equal to a threshold α set in advance in accordance with the inter-vehicle distance difference Ddiff, the HEV-CU 130 may determine that the driver clearly intends to accelerate. In other words, if the actual accelerator opening degree Acc is greater than or equal to the threshold α set in advance in accordance with the inter-vehicle distance difference Ddiff as illustrated in FIG. 4, the HEV-CU 130 may set the effectiveness ratio at 100% and have the actual accelerator opening degree Acc agree with the control accelerator opening degree. Setting the effectiveness ratio in this way makes smooth passing possible.

The control accelerator opening degree is decided on the basis of not only the actual accelerator opening degree Acc based on an accelerator operation of the driver, but also the effectiveness ratio set in accordance with the subject vehicle velocity V, the relative velocity Vd, the inter-vehicle distance D, or the like. The relationship between the actual accelerator opening degree Acc and the control accelerator opening degree is not necessarily constant. The solid line of FIG. 4 thus illustrates an example of the relationship between the actual accelerator opening degree Acc and the control accelerator opening degree. The relationship between the actual accelerator opening degree Acc and the control accelerator opening degree is not limited to such an example.

In this way, the HEV-CU 130 adjusts the target torque so as to prevent the subject vehicle 1 from approaching the preceding vehicle too much, and controls the driving force so as to prevent the vehicle 1 from repeating acceleration and deceleration. This shortens the running time of the engine 55 and decreases the fuel injection quantity to reduce fuel consumption. It is possible to suppress decrease in the electric power consumption efficiency for generating the driving force of the motor generator 74. The HEV-CU 130 cancels the driving force suppression if the driver clearly intends to accelerate, for example, at the time of passing. This improves drivability.

If the preceding vehicle goes away in the state in which the effectiveness ratio is lowered below 100% and the driving force suppression control is executed, the driving force suppression control is no longer necessary. If the driver restores the effectiveness ratio to 100% while the driver is not performing any accelerator operation, it is possible that the vehicle 1 accelerates more than expected by performing an accelerator operation next time in the same way as the driver does for the period for which the driving force is suppressed. If so, the driver has to perform a deceleration operation by performing a brake operation, and the fuel and electric power for accelerating the vehicle 1 more than expected can be wasted. If the driver performs no accelerator operation while the effectiveness ratio is slowly restored to 100%, the next accelerator operation would accelerate the vehicle 1 more than expected, similarly resulting in decrease in the fuel consumption efficiency or the electric power consumption efficiency. This decrease in the fuel consumption efficiency or the electric power consumption efficiency can be remarkable if the driver has a sophisticated driving skill and an accelerator operation is performed in a feedforward manner.

Accordingly, if the preceding vehicle goes away in the state in which the effectiveness ratio lowered below 100%, the HEV-CU 130 according to the present implementation gradually increases the effectiveness ratio and restores the effectiveness ratio to 100% only for the period for which the accelerator is on. This can prevent the vehicle 1 from accelerating more than expected when the driver performs an accelerator operation after the preceding vehicle goes away, and decrease the fuel consumption.

Additionally, "gradually increasing the effectiveness ratio and restoring the effectiveness ratio to 100%" means slowly restoring the effectiveness ratio to 100%, but does not include restoring the effectiveness ratio to 100% in one go. However, when the effectiveness ratio is gradually increased, the effectiveness ratio may be linearly or curvedly increased, or increased step by step.

<2-2. Configuration Example of Control Device for Vehicle>

Figure 5:
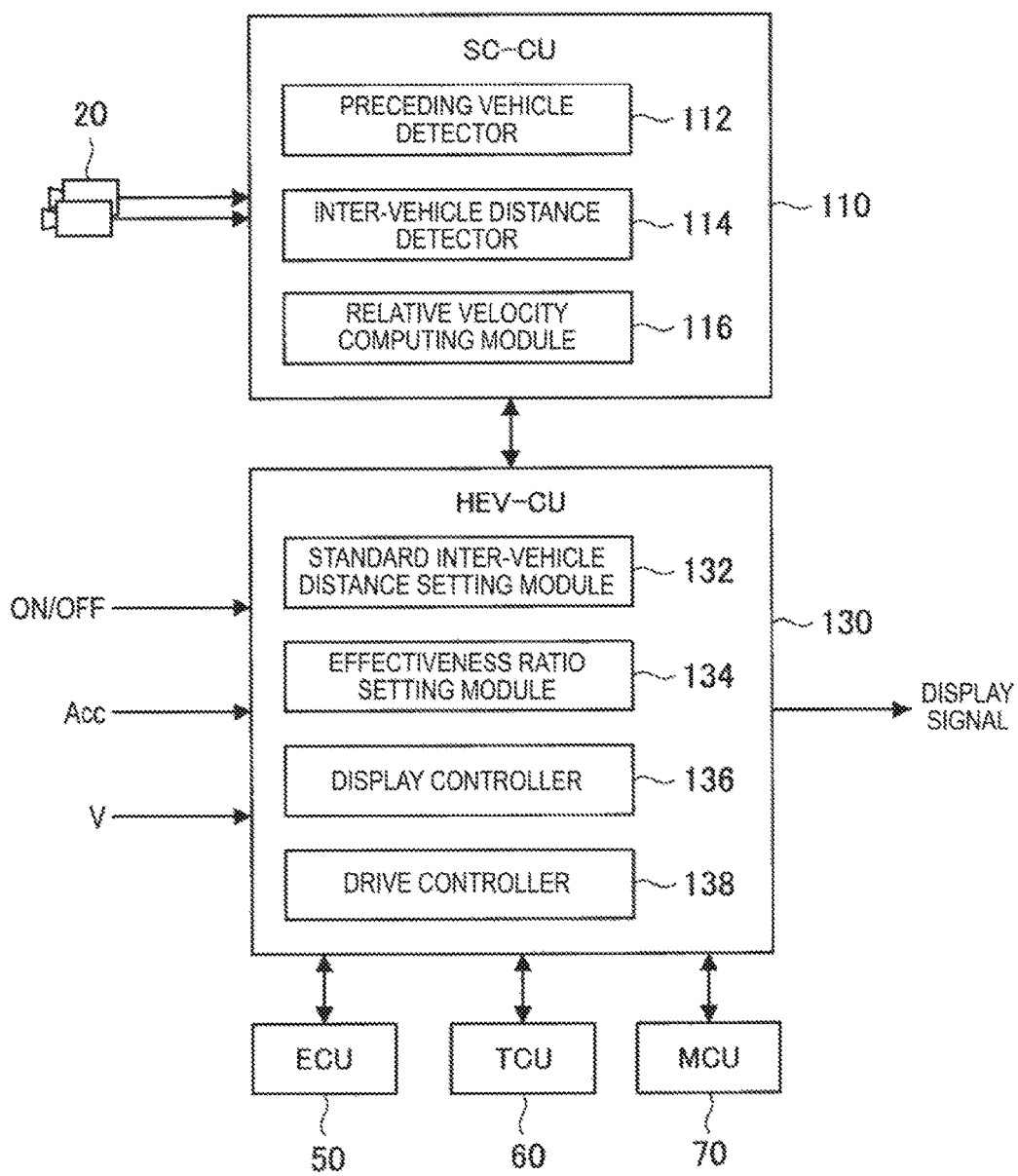
FIG. 5 is an explanatory diagram illustrating a configuration of a control device according to the implementation.

The following describes a configuration example of the control device for a vehicle according to the present implementation and control details in detail. FIG. 5 illustrates configuration examples of the SC-CU 110 and the HEV-CU 130 that implement the function of the control device for a vehicle according to an implementation of the present invention. The control device for a vehicle according to the implementation of the present invention may include a combination of control units or a single control unit.

(2-2-1. Imaging Processing Unit (SC-CU))

The SC-CU 110 receives imaging information of the stereo camera assembly 20. The SC-CU 110 computes the presence or absence of a preceding vehicle, the inter-vehicle distance D between the subject vehicle 1 and the preceding vehicle, the relative velocity Vd of the subject vehicle 1 and the preceding vehicle, and the like on the basis of the imaging information of the camera assembly 20.

The stereo camera assembly 20 coupled to the SC-CU 110 includes a pair of left and right CCD cameras that uses a solid-state image sensor such as a charge-coupled device (CCD). These left and right CCD cameras are attached to the front ceiling of the vehicle compartment at predetermined intervals, and capture stereo images of an object outside the vehicle 1 from different viewpoints. The stereo camera assembly 20 and the SC-CU 110 may be attached to the vehicle compartment as an integrated unit.

The SC-CU 110 uses the principle of triangulation to generate distance information on the basis of the disparity between the positions corresponding to a pair of stereo images that is captured by the stereo camera assembly 20 and shows the areas in the traveling direction of the subject vehicle 1. The SC-CU 110 further detects a preceding vehicle on the basis of the distance information. Alternatively, the SC-CU 110 may detect a preceding vehicle with image processing. If a preceding vehicle is detected, the SC-CU 110 computes, for example, the inter-vehicle distance D between the subject vehicle 1 and the preceding vehicle and the relative velocity Vd of the subject vehicle 1 and the preceding vehicle. Information of the presence or absence of a preceding vehicle, the inter-vehicle distance D, and the relative velocity Vd is sent to the HEV-CU 130.

Specifically, as illustrated in FIG. 5, the SC-CU 110 includes a preceding vehicle detector 112, an inter-vehicle distance detector 114, and a relative velocity computing module 116. Specifically, these modules can be implemented by the microcomputer executing programs.

The preceding vehicle detector 112 detects the presence or absence of a preceding vehicle serving as a three-dimensional object. For example, the preceding vehicle detector 112 performs the well-known grouping processing on the distance information generated from stereo images, and compares the distance information subjected to the grouping processing with three-dimensional object data set in advance to detect a preceding vehicle.

If the preceding vehicle detector 112 detects a preceding vehicle, the inter-vehicle distance detector 114 measures the inter-vehicle distance D between the subject vehicle 1 and the preceding vehicle on the basis of the stereo images (imaging information) captured by the stereo camera assembly 20. For example, the inter-vehicle distance detector 114 associates the detected preceding vehicle with the distance information generated from the stereo images to compute the inter-vehicle distance D on the basis of the associated distance information.

The relative velocity computing module 116 computes the relative velocity Vd of the subject vehicle 1 and the preceding vehicle. For example, the relative velocity computing module 116 may compute the relative velocity Vd as the proportion of changes in the inter-vehicle distance D over time. Note that the relative velocity Vd is equal to the value obtained by subtracting the subject vehicle velocity V from the velocity of the preceding vehicle in the present implementation. If the velocity of the preceding vehicle is higher than the subject vehicle velocity V, the relative velocity Vd has a positive value. Meanwhile, if the velocity of the preceding vehicle is lower than the subject vehicle velocity V, the relative velocity Vd has a negative value.

The presence or absence of a preceding vehicle, the inter-vehicle distance D, and the relative velocity Vd are not detected with an image captured by a stereo camera assembly alone. For example, the presence or absence of a preceding vehicle, the inter-vehicle distance D, and the relative velocity Vd may be detected with a monocular camera and an electromagnetic wave sensor. In this case, the control device can detect the presence or absence of a preceding vehicle by performing image processing on imaging information acquired by the monocular camera. In addition, the control device can detect the inter-vehicle distance D between the subject vehicle 1 and the preceding vehicle and the relative velocity Vd of the subject vehicle 1 and the preceding vehicle on the basis of detection information of the electromagnetic wave sensor.

(2-2-2. Hybrid Control Unit (HEV-CU))

The HEV-CU 130 controls the ECU 50, the TCU 60, and the MCU 70 in a coordination manner, and controls the output torque of the engine 55, the gear ratio of the automatic transmission 65, and the output torque of the motor generator 74, thereby performing the drive control on the vehicle 1. Specifically, the HEV-CU 130 sets the effectiveness ratio indicating the proportion of the accelerator operation amount of the driver to be reflected in the drive control in the state in which the control switch 30 is on, and performs the drive control on the vehicle 1 on the basis of the effectiveness ratio in the present implementation. The HEV-CU 130 generates a display signal for causing the display 150 to display information, and outputs the generated display signal to the display 150.

Specifically, as illustrated in FIG. 5, the HEV-CU 130 includes a standard inter-vehicle distance setting module 132, an effectiveness ratio setting module 134, a display controller 136, and a drive controller 138. These modules can be implemented by the microcomputer executing programs. The HEV-CU 130 receives information of the presence or absence of a preceding vehicle, the inter-vehicle distance D, and the relative velocity Vd from the SC-CU 110. In addition, the HEV-CU 130 receives an on/off signal of the control switch 30, information of the actual accelerator opening degree Acc, and information of the subject vehicle velocity V.

Figure 6:
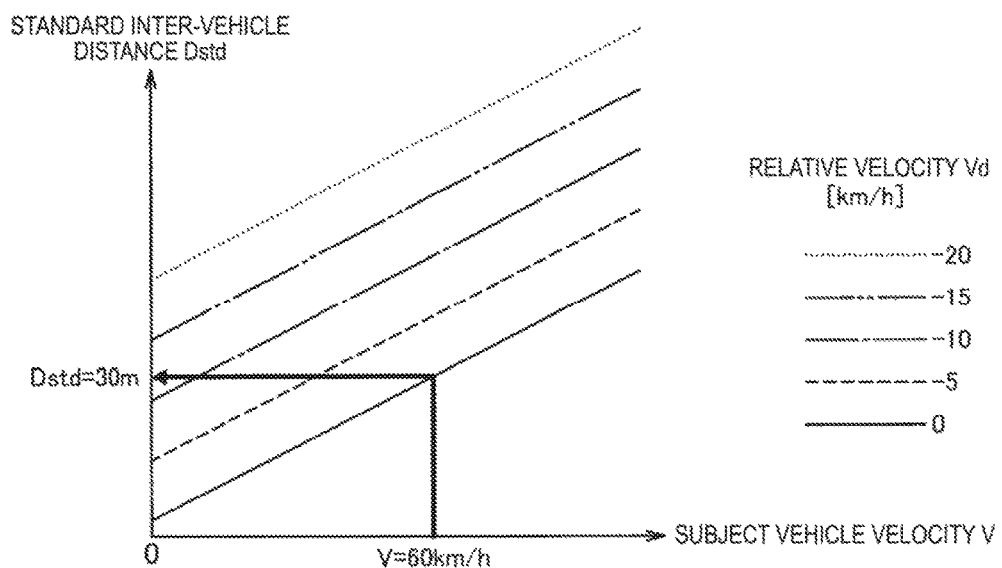
FIG. 6 is an explanatory diagram illustrating a relationship between subject vehicle velocity and a standard inter-vehicle distance.

The standard inter-vehicle distance setting module 132 sets a standard inter-vehicle distance Dstd in accordance with the subject vehicle velocity V and the relative velocity Vd. FIG. 6 is an explanatory diagram illustrating an example of the standard inter-vehicle distance Dstd set by the standard inter-vehicle distance setting module 132 in accordance with the subject vehicle velocity V and the relative velocity Vd. If the inter-vehicle distance D is less than the standard inter-vehicle distance Dstd, the driving force suppression control is performed in the present implementation. For example, if the subject vehicle velocity V is high or the relative velocity Vd is high, the standard inter-vehicle distance setting module 132 sets the standard inter-vehicle distance Dstd at a large enough value, thereby making it possible to begin the driving force suppression control before sudden deceleration is necessary.

For example, as illustrated in FIG. 6, the standard inter-vehicle distance setting module 132 may set the standard inter-vehicle distance Dstd in a manner that the standard inter-vehicle distance Dstd increases with increase in the subject vehicle velocity V even if the relative velocity Vd is constant. The relationship between the subject vehicle velocity V and the standard inter-vehicle distance Dstd is not limited to the above-described example. For example, the standard inter-vehicle distance setting module 132 may set the standard inter-vehicle distance Dstd in a manner that the standard inter-vehicle distance Dstd does not at least decrease with increase in the subject vehicle velocity V even if the relative velocity Vd is constant. In other words, the standard inter-vehicle distance setting module 132 may set the standard inter-vehicle distance Dstd by using the subject vehicle velocity V as a parameter in a manner that the standard inter-vehicle distance Dstd weakly increases.

As illustrated in FIG. 6, the standard inter-vehicle distance setting module 132 may set the standard inter-vehicle distance Dstd in a manner that the standard inter-vehicle distance Dstd increases as the relative velocity Vd increases (i.e., as the subject vehicle velocity V is higher than the velocity of the preceding vehicle) if the subject vehicle velocity V is constant.

Figure 7:
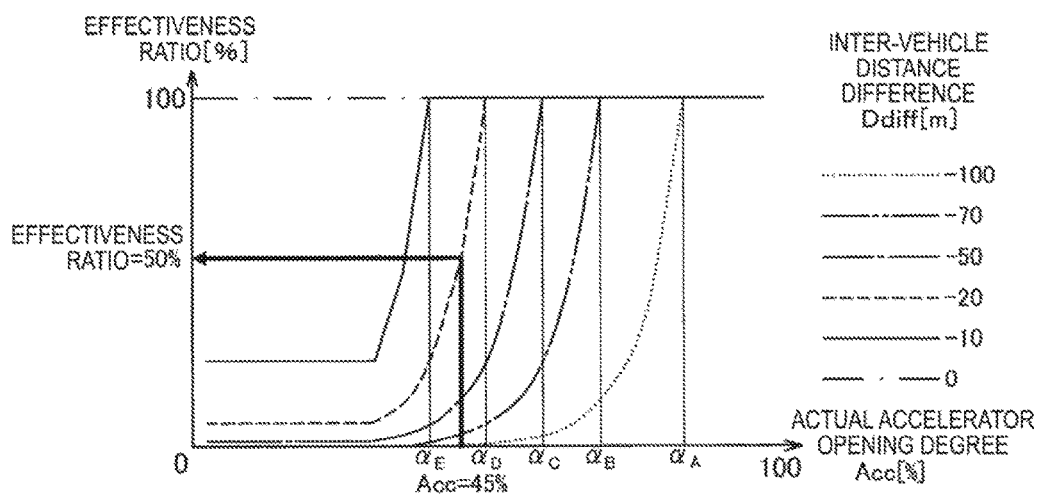
FIG. 7 is an explanatory diagram illustrating a relationship between an actual accelerator opening degree and an effectiveness ratio.

The effectiveness ratio setting module 134 sets the effectiveness ratio indicating the proportion of the accelerator operation amount of the driver to be reflected in the drive control on the basis of the actual accelerator opening degree Acc and the inter-vehicle distance difference Ddiff obtained by subtracting the standard inter-vehicle distance Dstd from the inter-vehicle distance D. FIG. 7 is an explanatory diagram illustrating an example of the effectiveness ratio set by the effectiveness ratio setting module 134 on the basis of the actual accelerator opening degree Acc and the inter-vehicle distance difference Ddiff.

For example, if the inter-vehicle distance difference Ddiff has a negative value, the effectiveness ratio setting module 134 sets the effectiveness ratio below 100%, and suppresses the driving force. Meanwhile, the effectiveness ratio setting module 134 sets the effectiveness ratio at 100% irrespective of the actual accelerator opening degree Acc if the inter-vehicle distance difference Ddiff is greater than or equal to 0. The effectiveness ratio is set in this way, thereby suppressing the driving force and preventing the subject vehicle 1 from approaching the preceding vehicle too much if the inter-vehicle distance D is less than the standard inter-vehicle distance Dstd. Meanwhile, if the inter-vehicle distance D is greater than or equal to the standard inter-vehicle distance Dstd (i.e., the inter-vehicle distance D is sufficiently secured), the driving force is not suppressed, but it is possible to keep preferable drivability.

If the actual accelerator opening degree Acc is constant, the effectiveness ratio setting module 134 may set the effectiveness ratio in a manner that the effective ratio increases, or does not at least decrease with increase in the inter-vehicle distance difference Ddiff as illustrated in FIG. 7. In other words, the effectiveness ratio setting module 134 may set the effectiveness ratio by using the inter-vehicle distance difference Ddiff as a parameter in a manner that the effectiveness ratio weakly increases. The effectiveness ratio is set in this way, thereby setting a smaller effectiveness ratio and making it easier to suppress the driving force if the inter-vehicle distance difference Ddiff is smaller (i.e., the inter-vehicle distance D is smaller as compared with the standard inter-vehicle distance Dstd). It is thus easier to sufficiently secure the inter-vehicle distance D.

If the inter-vehicle distance difference Ddiff is constant, the effectiveness ratio setting module 134 may set the effectiveness ratio in a manner that the effectiveness ratio increases or does not at least decrease with increase in the actual accelerator opening degree Acc as illustrated in FIG. 7. In other words, the effectiveness ratio setting module 134 may set the effectiveness ratio by using the actual accelerator opening degree Acc as a parameter in a manner that the effectiveness ratio weakly increases. As illustrated especially in FIG. 7, the effectiveness ratio setting module 134 may set the effectiveness ratio at 100% if the actual accelerator opening degree Acc is greater than or equal to the threshold $\alpha$ ($\alpha A$ to $\alpha E$) set in advance in accordance with the inter-vehicle distance difference Ddiff. A larger value may be set as the threshold $\alpha$ with decrease in the inter-vehicle distance difference Ddiff. The effectiveness ratio is set in this way, thereby canceling the driving force suppression control and improving drivability if the driver clearly intends to accelerate.

If the inter-vehicle distance difference Ddiff is small and the actual accelerator opening degree Acc is low, the effectiveness ratio may be set to have a smaller value as illustrated in FIG. 7, but the effectiveness ratio may be set to have a value of more than 0% at a minimum. Setting the effectiveness ratio in this way makes the driver feel less strange and improves drivability as compared with the effectiveness ratio set at 0%.

If the preceding vehicle goes away in the state in which the effectiveness ratio is lowered below 100%, the effectiveness ratio setting module 134 gradually increases the effectiveness ratio and restores the effectiveness ratio to 100% for the period for which the accelerator is on. In other words, the effectiveness ratio is gradually increased and restored to 100% only for the period for which the driver is stepping on the accelerator pedal after the preceding vehicle goes away in the state in which the effectiveness ratio is lowered and the driving force is suppressed. This gradually restores the suppressed driving force to the normal driving force even if the driver steps on the accelerator in the same way as the driver does when the driving force suppression control is performed. Accordingly, the vehicle 1 is prevented from accelerating more than expected. Especially increasing the effectiveness ratio only for the accelerator operation period makes it possible to prevent the vehicle 1 from accelerating more than expected in response to the later acceleration operation even if no accelerator operation is performed for a while after the preceding vehicle goes away.

Figure 8:
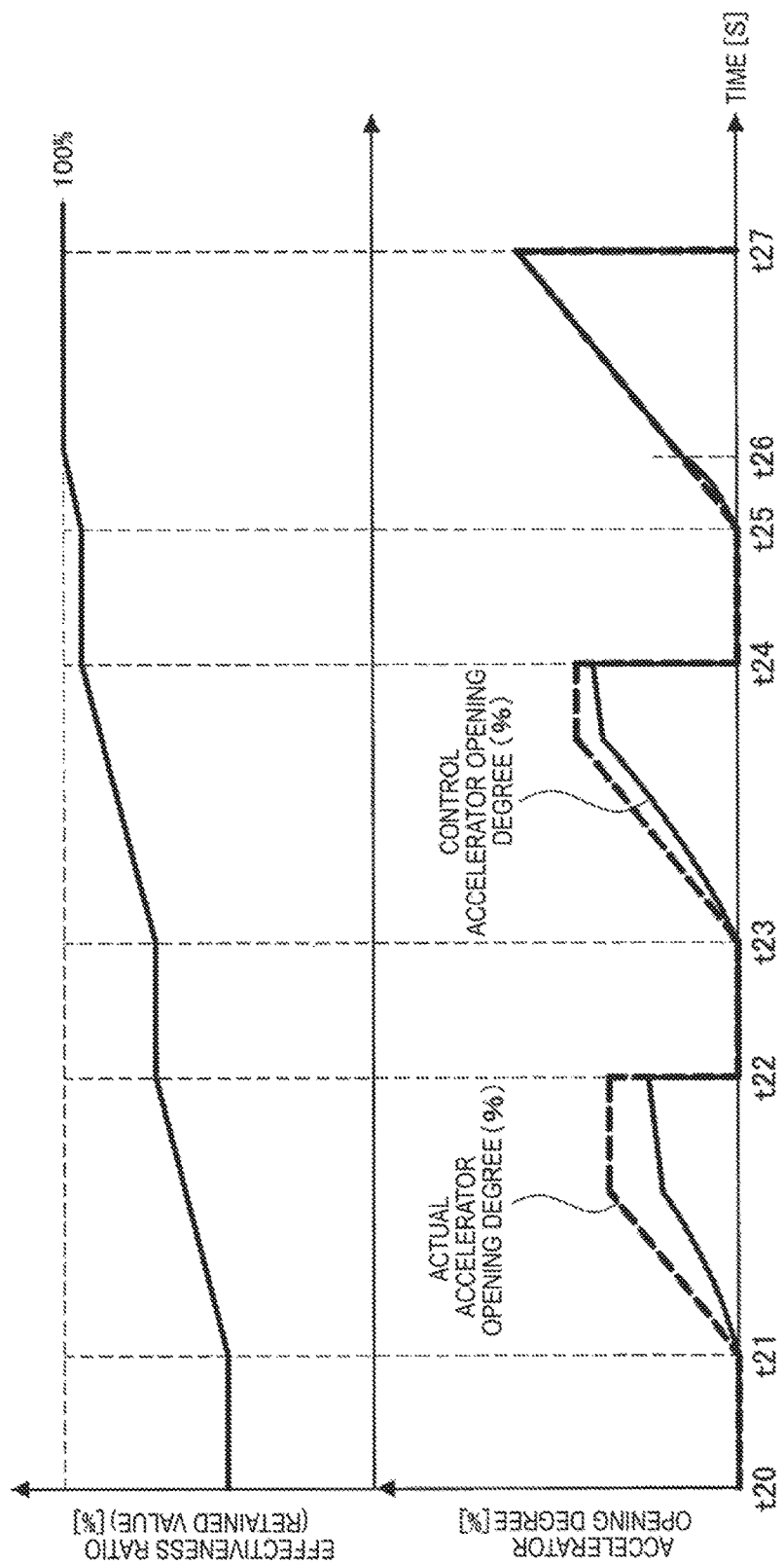
FIG. 8 is a time chart for describing an example about how to restore an effectiveness ratio.

FIG. 8 is an explanatory diagram illustrating a change in the effectiveness ratio when the preceding vehicle goes away in the state in which the effectiveness ratio lowered. The dashed line of the accelerator opening degree illustrated in the lower part of FIG. 8 represents the actual accelerator opening degree Acc, and the solid line represents the control accelerator opening degree. In the example illustrated in FIG. 8, it is assumed that the preceding vehicle goes away at time t20, at which the effectiveness ratio is lowered. The driver does not step on the accelerator for the period between the time t20 and time t21. Afterwards, the driver begins to step on the accelerator at the time t21, and the accelerator is on for the period between the time t21 and time t22. The accelerator is temporarily turned off at the time t22, and then the driver begins to step on the accelerator again at time t23. The accelerator is on for the period between the time t23 and time t24. Further, the accelerator is temporarily turned off at the time t24, and then the driver begins to step on the accelerator again at time t25. The accelerator is on for the period between the time t25 and time t27.

In the present implementation, the effectiveness ratio does not increase, but is maintained irrespective of the absence of the preceding vehicle for the periods between the time t20 and the time t21, the time t22 and the time t23, and the time t24 and the time t25, for which the accelerator is off. Meanwhile, the effectiveness ratio gradually increases for the periods between the time t21 and the time t22, the time t23 and the time t24, for which the accelerator is on. The effectiveness ratio gradually increases until time t26, at which the effectiveness ratio is restored to 100%, for the period between the time t25 and the time t27, for which the accelerator is on. The effectiveness ratio is maintained at 100% after the time t26, at which the effectiveness ratio reaches 100%, unless a preceding vehicle comes again and the inter-vehicle distance difference Ddiff has a negative value.

To gradually increase the effectiveness ratio for the period for which the accelerator is on, the effectiveness ratio may be increased for the period for which the vehicle 1 accelerates. Even if the actual accelerator opening degree Acc has a positive value and remains constant, the target torque can increase with increase in the effectiveness ratio in the present implementation. This would increase the driving force and cause the vehicle 1 to begin to travel even if the driver operates the accelerator to the degree to which the vehicle 1 does not begin to travel, for example, while the vehicle 1 is stopped on a sharp slope. It is possible that the effectiveness ratio increases and the driver fails to lower the subject vehicle velocity though the driver lowers the actual accelerator opening degree Acc to lower the subject vehicle velocity. It is thus possible to improve drivability by gradually increasing the effectiveness ratio only while the accelerator is on and the vehicle 1 is accelerating.

The effectiveness ratio setting module 134 may gradually increase the effectiveness ratio after retaining the effectiveness ratio at the current setting value for a predetermined time after the preceding vehicle goes away. If the driver keeps stepping on the accelerator, this makes it possible to prevent the vehicle 1 from beginning to accelerate in the same accelerator operation amount and to make the driver feel less strange immediately after the preceding vehicle goes away.

Figure 9:
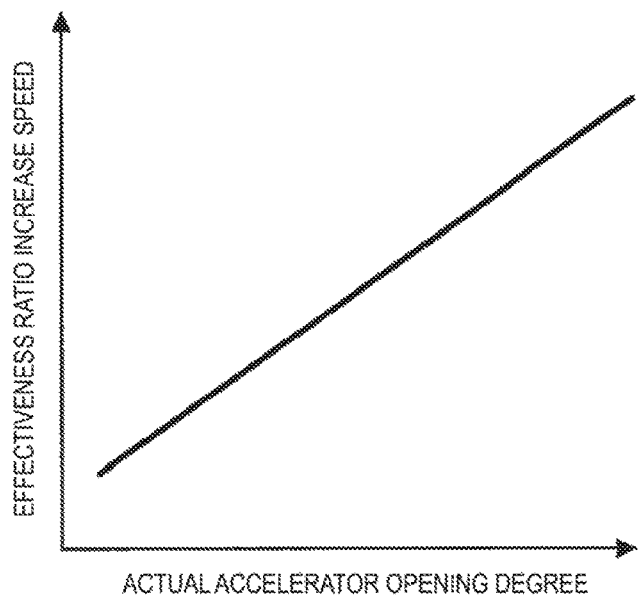
FIG. 9 is an explanatory diagram illustrating a relationship between an actual accelerator opening degree and increase speed of an effectiveness ratio.

The increase speed for gradually increasing the effectiveness ratio may vary in accordance with the actual accelerator opening degree Acc. FIG. 9 is an explanatory diagram illustrating the relationship between the actual accelerator opening degree Acc and the increase speed of the effectiveness ratio. As illustrated in FIG. 9, the increase speed of the effectiveness ratio may increase with increase in the actual accelerator opening degree Acc. The vehicle 1 accelerates faster with increase in the actual accelerator opening degree Acc. Accordingly, it is also possible to make the driver feel less strange by increasing the increase speed of the effectiveness ratio. The driver is supposed to intend to accelerate more strongly with increase in the actual accelerator opening degree Acc. Accordingly, it is possible to restore the effectiveness ratio to 100% faster.

Figure 10:
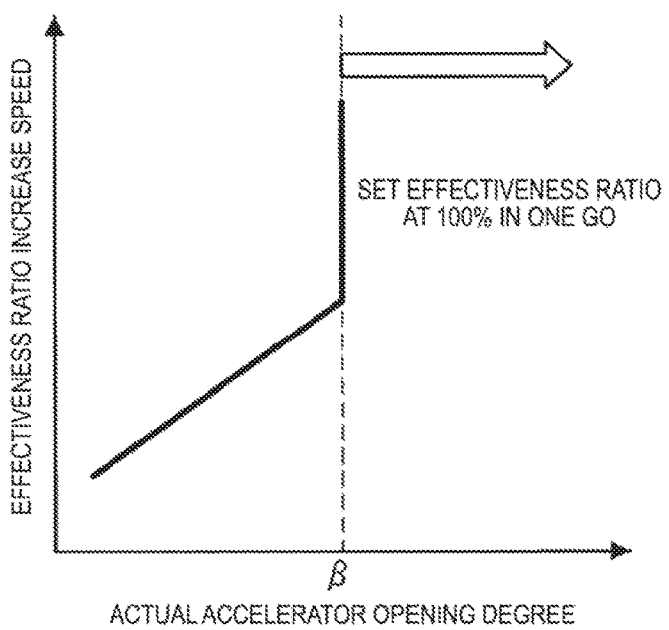
FIG. 10 is an explanatory diagram illustrating an example in which an effectiveness ratio is restored to 100% in one go.

If the actual accelerator opening degree Acc exceeds a predetermined threshold, the effectiveness ratio setting module 134 may restore the effectiveness ratio to 100% at that time. FIG. 10 is an explanatory diagram illustrating the relationship between the actual accelerator opening degree Acc and the increase speed of the effectiveness ratio. FIG. 10 illustrates an example in which the effectiveness ratio is restored to 100% if the actual accelerator opening degree Acc is greater than or equal to a threshold $\beta$ set in advance. For example, if the driver steps on the accelerator strongly to accelerate for passing a vehicle, the driver is supposed to clearly intend to accelerate. Accordingly, it is possible to restore the effectiveness ratio to 100% still faster. If the accelerator is stepped on strongly, the vehicle 1 accelerates still faster. Accordingly, even if the effectiveness ratio is restored to 100% in one go, it is possible to make the driver feel less strange.

As described above, if the inter-vehicle distance D between the subject vehicle 1 and the preceding vehicle falls below the standard inter-vehicle distance Dstd, the effectiveness ratio setting module 134 lowers the effectiveness ratio below 100% and performs the driving force suppression control. This prevents the subject vehicle 1 from approaching the preceding vehicle too much, and prevents the subject vehicle 1 from repeating acceleration and deceleration. It is thus possible to decrease the fuel or electric power wasted for acceleration, and to improve the fuel consumption efficiency or the electric power consumption efficiency.

If the preceding vehicle goes away in the state in which the effectiveness ratio is lowered, the effectiveness ratio setting module 134 gradually increases the effectiveness ratio and restores the effectiveness ratio to 100% as long as the accelerator is on. This makes it possible to prevent the driver from accelerating, after the preceding vehicle goes away, the vehicle 1 more than expected by stepping on the accelerator in the same way as the driver does in the state in which the driving force is suppressed. It is thus possible to decrease the fuel or electric power to be wasted by a later brake operation, and to improve the fuel consumption efficiency or the electric power consumption efficiency.

The drive controller 138 performs the drive control on the subject vehicle 1 on the basis of the effectiveness ratio set by the effectiveness ratio setting module 134. For example, the drive controller 138 computes the control accelerator opening degree by multiplying the actual accelerator opening degree Acc by the effectiveness ratio, and computes the target value (target torque) of the torque output by the engine 55 and the motor generator 74 in accordance with the control accelerator opening degree.

The display controller 136 causes the display 150 included in the vehicle 1 to display information on at least one of the standard inter-vehicle distance Dstd, the inter-vehicle distance difference Ddiff, or the effectiveness ratio. The display controller 136 according to the present implementation generates a display signal, and outputs the generated display signal to the display 150 to cause the display 150 to display an information presentation screen as illustrated in FIG. 11.

Figure 11:
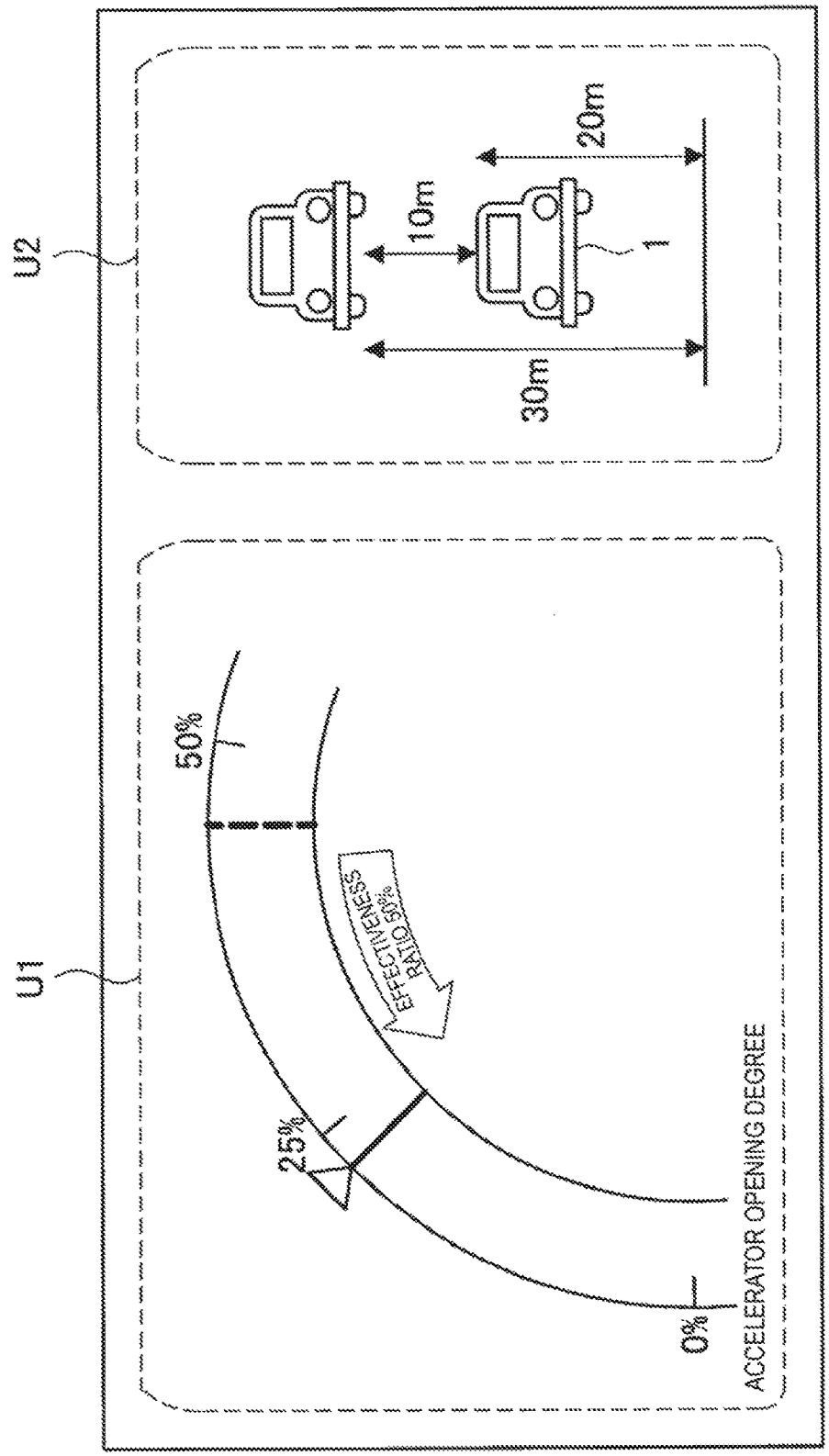
FIG. 11 is an explanatory diagram illustrating an example of a screen displayed by a display.

FIG. 11 is an explanatory diagram illustrating an example of an information presentation screen displayed on the display 150 when the driving force suppression control is performed. The information presentation screen illustrated in FIG. 11 includes an accelerator opening degree display area U1 and an inter-vehicle distance display area U2. This example presupposes that the subject vehicle 1 travels at a velocity of 60 km/h with an actual accelerator opening degree of 45% and an inter-vehicle distance of 10 m to a preceding vehicle. In this case, the standard inter-vehicle distance Dstd is 30 m, the inter-vehicle distance difference Ddiff is −20 m (=the inter-vehicle distance (10 m)−the standard inter-vehicle distance (30 m)) in accordance with FIG. 6, and the effectiveness ratio is thus 50% in accordance with FIG. 7.

The dashed line represents the actual accelerator opening degree (45%) in the accelerator opening degree display area U1, while the solid line represents the control accelerator opening degree (22.5%). The effectiveness ratio is also displayed in the accelerator opening degree display area U1. Displaying the effectiveness ratio facilitates the driver to understand that the control accelerator opening degree for computing the target torque is suppressed as compared with the actual accelerator opening degree, especially if the effectiveness ratio is less than 100%.

While the preceding vehicle and the subject vehicle 1 are displayed on the inter-vehicle distance display area U2, information of the current inter-vehicle distance D (10 m in FIG. 11), the standard inter-vehicle distance Dstd (30 m in FIG. 11), the inter-vehicle distance difference Ddiff (20 m in FIG. 11, which is represented as a positive value to facilitate the driver's understanding) is displayed on the inter-vehicle distance display area U2. The information of the inter-vehicle distance D, the standard inter-vehicle distance Dstd, and the inter-vehicle distance difference Ddiff is displayed, thereby facilitating the driver to understand why the driving force is suppressed especially when the effectiveness ratio is less than 100%.

The display controller 136 may be included in a display control unit different from the HEV-CU 130. In this case, the HEV-CU 130 outputs necessary information such as the actual accelerator opening degree Acc, the control accelerator opening degree, the inter-vehicle distance D, the standard inter-vehicle distance Dstd, and the inter-vehicle distance difference Ddiff to the display control unit.

3. FLOWCHART

The configuration of the control device for the vehicle 1 according to the present implementation has been described so far. Next, the drive control processing performed by the control device for the vehicle 1 according to the present implementation will be described. The following drive control processing may be repeatedly performed for each predetermined processing cycle or immediately after the last drive control processing terminates.

Figure 12:
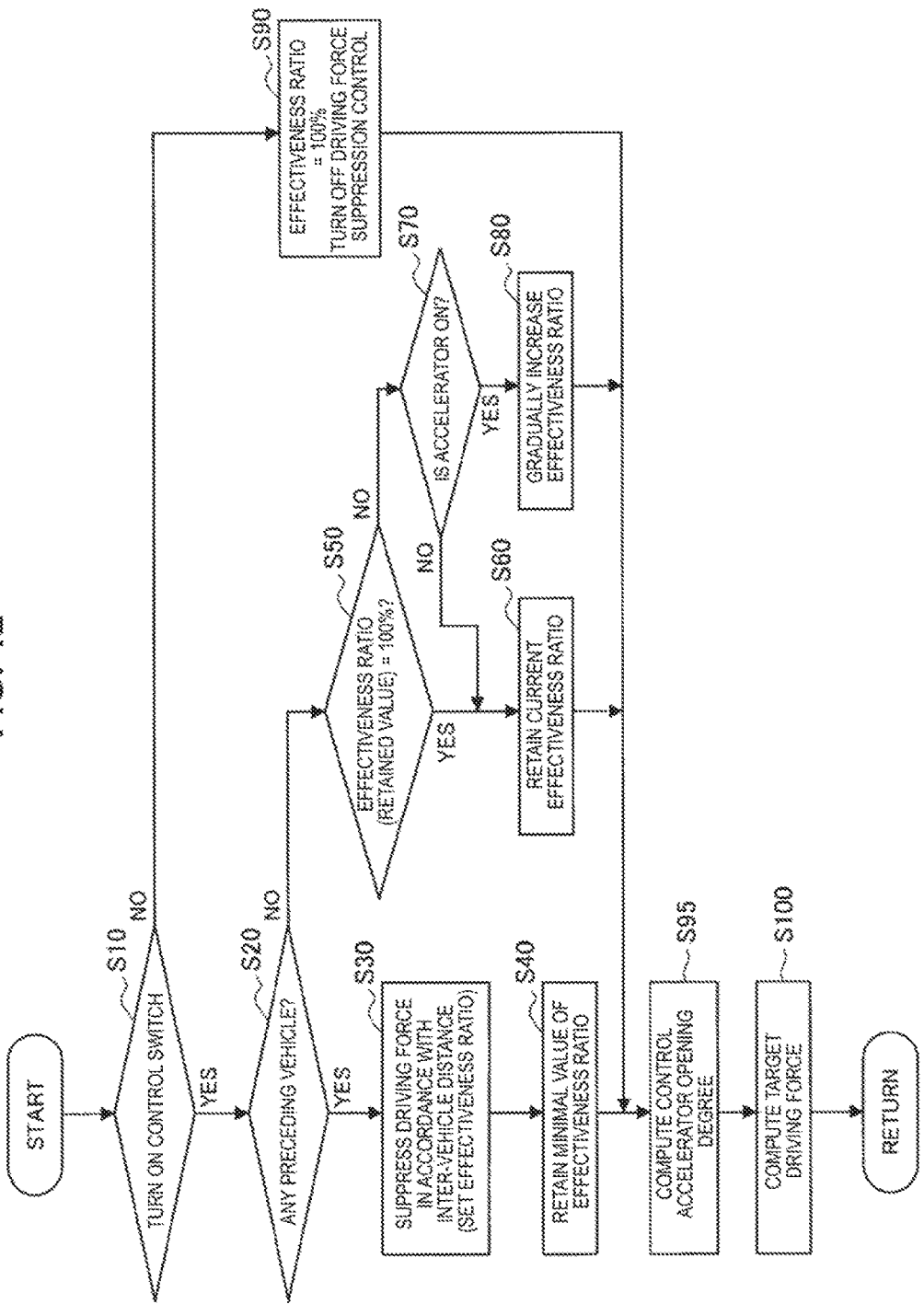
FIG. 12 is a flowchart illustrating the drive control processing according to the implementation.

FIG. 12 is a flowchart illustrating an example of the drive control processing performed by the control device according to the present implementation. FIG. 12 is a flowchart illustrating a routine executed by the HEV-CU 130 according to the present implementation. First of all, in step S10, the HEV-CU 130 determines whether the control switch 30 is on. For example, the effectiveness ratio setting module 134 of the HEV-CU 130 reads an on/off signal of the control switch 30 to determine whether the control switch 30 is on.

If the control switch 30 is off (S10: NO), the driving force suppression control is turned off, and the effectiveness ratio setting module 134 retains the effectiveness ratio at 100% in step S90 and proceeds to step S95. Meanwhile, if the control switch 30 is on (S10: YES), the effectiveness ratio setting module 134 of the HEV-CU 130 determines in step S20 whether there is a preceding vehicle. As discussed above, the SC-CU 110 detects the presence or absence of a preceding vehicle on the basis of imaging information of the stereo camera assembly 20. Accordingly, the HEV-CU 130 can determine the presence or absence of a preceding vehicle on the basis of information sent from the SC-CU 110. If there is a preceding vehicle (S20: YES), the HEV-CU 130 sets the effectiveness ratio according to the inter-vehicle distance D to execute the driving force suppression control in step S30.

Figure 13:
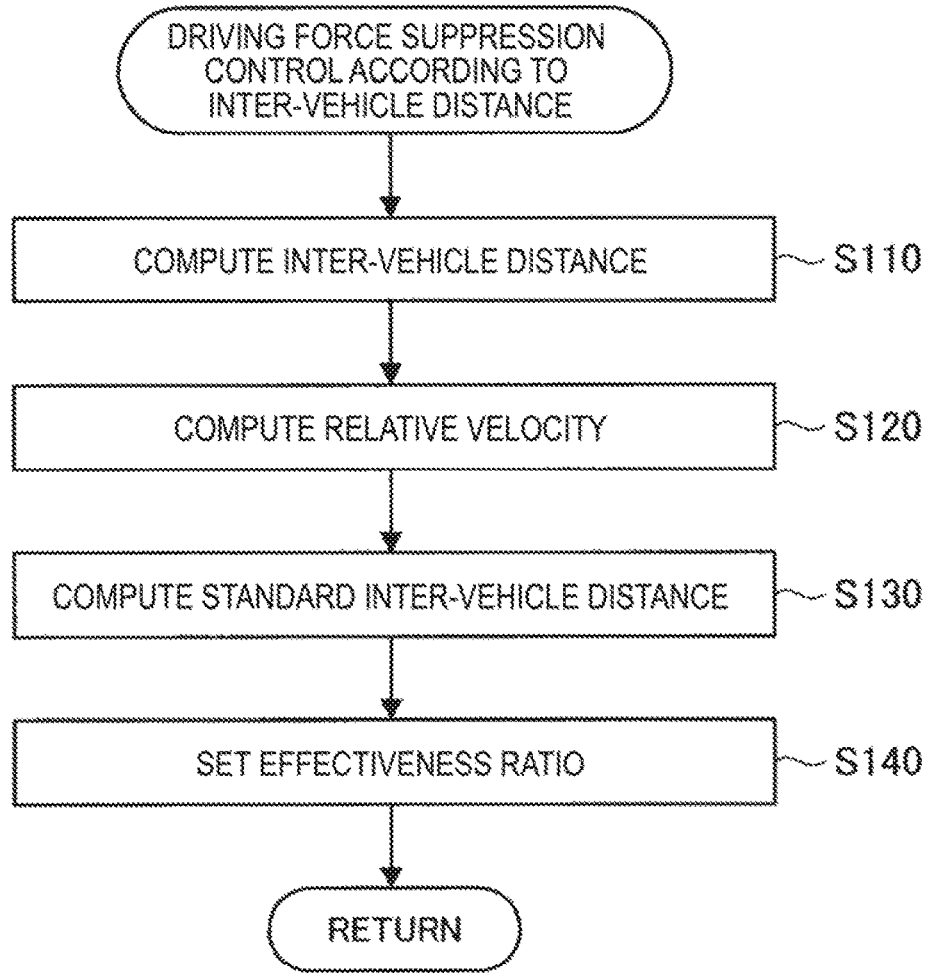
FIG. 13 is a flowchart illustrating processing of setting an effectiveness ratio in accordance with an inter-vehicle distance.

FIG. 13 is a flowchart illustrating an example of the driving force suppression control processing executed in step S30 of FIG. 12. FIG. 13 is a flowchart illustrating the routine of the driving force suppression control processing executed by the SC-CU 110 and the HEV-CU 130 according to the present implementation. First of all, in step S110, the inter-vehicle distance detector 114 of the SC-CU 110 computes the inter-vehicle distance D between the subject vehicle 1 and the preceding vehicle on the basis of imaging information of the stereo camera assembly 20. If the preceding vehicle detector 112 of the SC-CU 110 detects no preceding vehicle, an infinite value or a predetermined value that is considerably large may be set as the inter-vehicle distance D. Next, in step S120, the relative velocity computing module 116 of the SC-CU 110 computes the relative velocity Vd on the basis of a change in the inter-vehicle distance D over time.

Next, the standard inter-vehicle distance setting module 132 of the HEV-CU 130 computes the standard inter-vehicle distance Dstd on the basis of the subject vehicle velocity V and the inter-vehicle distance D in step S130. Specifically, the standard inter-vehicle distance setting module 132 refers to the map and the like illustrated as an example in FIG. 6 to obtain the standard inter-vehicle distance Dstd in accordance with the subject vehicle velocity V and the inter-vehicle distance D. Next, the effectiveness ratio setting module 134 of the HEV-CU 130 sets the effectiveness ratio on the basis of the standard inter-vehicle distance Dstd, the inter-vehicle distance D, and the actual accelerator opening degree Acc in step S140, thereby terminating the routine of the effectiveness ratio setting processing.

Figure 14:
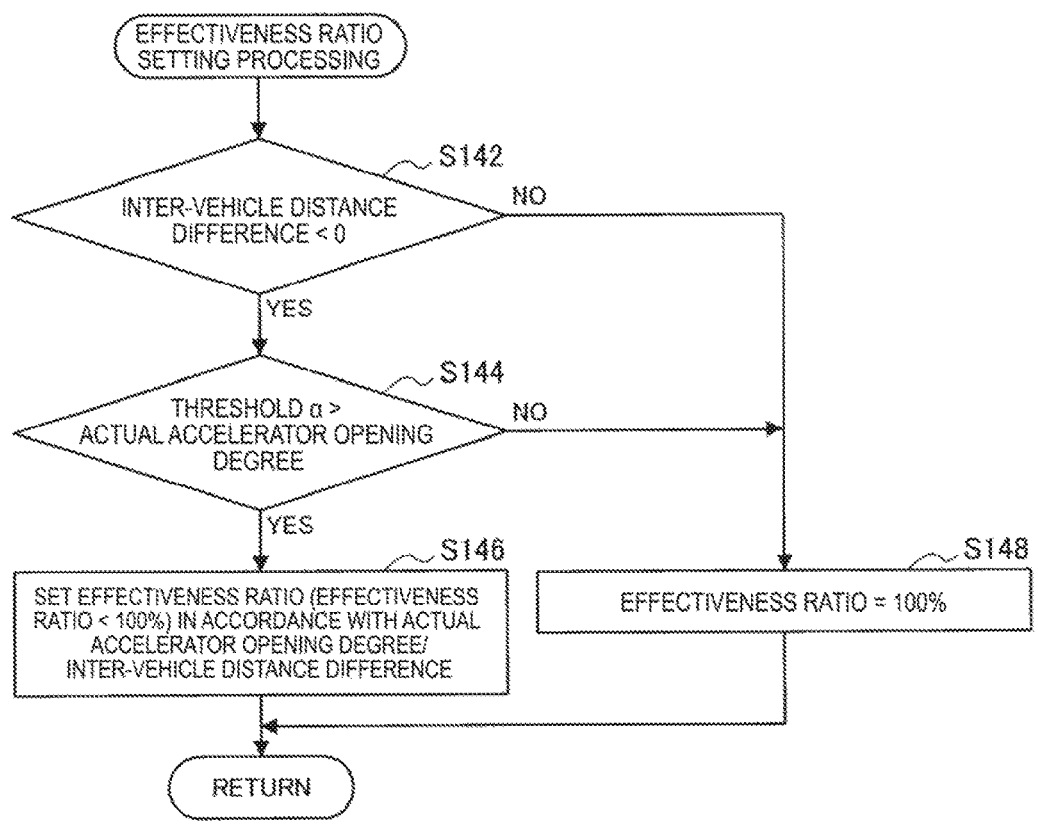
FIG. 14 is a flowchart illustrating effectiveness ratio setting processing.

FIG. 14 is a flowchart illustrating an example of the effectiveness ratio setting processing performed by the effectiveness ratio setting module 134 in step S140. First of all, in step S142, the effectiveness ratio setting module 134 determines whether the inter-vehicle distance difference Ddiff obtained by subtracting the standard inter-vehicle distance Dstd from the inter-vehicle distance D has a negative value. If the inter-vehicle distance difference Ddiff has a negative value (S142: YES), the effectiveness ratio setting module 134 compares the threshold α set in advance in accordance with the inter-vehicle distance difference Ddiff and the actual accelerator opening degree Acc in step S144.

If the threshold α is greater than the actual accelerator opening degree Acc (S144: YES), the effectiveness ratio setting module 134 sets the effectiveness ratio below 100% in step S146 in accordance with the actual accelerator opening degree Acc and the inter-vehicle distance difference Ddiff. Specifically, the effectiveness ratio setting module 134 refers to the map and the like illustrated as an example in FIG. 7 to set the effectiveness ratio according to the actual accelerator opening degree Acc and the inter-vehicle distance difference Ddiff. Meanwhile, if the inter-vehicle distance difference Ddiff is greater than or equal to 0 (S142: NO), or if the actual accelerator opening degree Acc is greater than or equal to the threshold α (S144: NO), the effectiveness ratio setting module 134 sets the effectiveness ratio at 100% in step S148.

The effectiveness ratio setting module 134 sets the effectiveness ratio according to the inter-vehicle distance difference Ddiff and the actual accelerator opening degree Acc by repeating the above-described steps S142 to S148.

FIG. 12 is referred to again. After the effectiveness ratio is set in step S30, the effectiveness ratio setting module 134 retains the minimal value of the effectiveness ratio in step S40 and proceeds to step S95. In other words, if the inter-vehicle distance D between the subject vehicle 1 and the preceding vehicle temporarily falls below the standard inter-vehicle distance Dstd, the effectiveness ratio to be reflected in the driving force suppression control can decrease, but does not increase. This changes the effectiveness ratio each time the inter-vehicle distance D or the actual accelerator opening degree Acc is changed, thereby preventing the driver from feeling strange.

Meanwhile, if there is no preceding vehicle in step S20 (S20: NO), the effectiveness ratio setting module 134 determines in step S50 whether the retained value of the current effectiveness ratio is 100%. If the retained value of the current effectiveness value is 100% (S50: YES), the effectiveness ratio setting module 134 proceeds to step S95 while retaining the current effectiveness ratio (=100%) in step S60. Meanwhile, if the retained value of the current effectiveness ratio is less than 100% (S50: NO), the effectiveness ratio setting module 134 determines in step S70 whether the accelerator is on. If the accelerator is off (S70: NO), the effectiveness ratio setting module 134 proceeds to step S95 while retaining the current effectiveness ratio in step S60.

Meanwhile, if the accelerator is on (S70: YES), the effectiveness ratio setting module 134 gradually increases the effectiveness ratio in step S80. The increase speed of the effectiveness ratio may then increase with increase in the actual accelerator opening degree Acc by the driver as illustrated in FIG. 9. If the actual accelerator opening degree Acc by the driver is greater than or equal to the predetermined threshold β as illustrated in FIG. 10, it may be determined that the driver strongly intends to accelerate and the effectiveness ratio may be restored to 100% in one go.

After the effectiveness ratio is decided in steps S40, S60, S80, and S90, the drive controller 138 computes the control accelerator opening degree in step S95 in accordance with the set effectiveness ratio. If the control switch 30 is off, if there is no preceding vehicle and the retained value of the effectiveness ratio is 100%, or if there is a preceding vehicle and the inter-vehicle distance D is greater than or equal to the standard inter-vehicle distance Dstd, the actual accelerator opening degree Acc is set as the control accelerator opening degree. Meanwhile, if there is a preceding vehicle and the inter-vehicle distance D is less than the standard inter-vehicle distance Dstd, the value obtained by multiplying the actual accelerator opening degree Acc by the effectiveness ratio is set as the control accelerator opening degree. Alternatively, the value obtained by multiplying the actual accelerator opening degree Acc by the effectiveness ratio is set as the control accelerator opening degree for the period from the time at which the preceding vehicle goes away to the time at which the effectiveness ratio is restored to 100%.

Next, the drive controller 138 computes the target torque in step S100 with the control accelerator opening degree. If the effectiveness ratio is set below 100%, the computed target torque has a smaller value than the value that the computed target torque has when the actual accelerator opening degree Acc is directly reflected. Afterwards, the drive controller 138 sets the target torque of the engine 55 and the motor generator 74 in accordance with the target torque, and outputs control commands to the ECU 50, the TCU 60, and the MCU 70.

As described above, if the preceding vehicle goes away in the state in which the effectiveness ratio is lowered below 100%, the effectiveness ratio is gradually increased and restored to 100% in the present implementation only for the period for which the accelerator is on. The vehicle 1 is thus prevented from accelerating more than expected by restoring the effectiveness ratio for the period for which the accelerator is off after the preceding vehicle goes away, and then operating the accelerator in the same way as the driver does in the state in which the effectiveness ratio is lowered. It is thus possible to decrease the amount of fuel consumed to generate the driving force of the engine 55. It is also possible to decrease the amount of electric power consumed to generate the driving force of the motor generator 74. Further, it is possible to decrease the amount of wasted fuel or electric power by a brake operation of decelerating the vehicle that is accelerated too much.

4. CONCLUSION

As described above, according to the control device for a vehicle according to the present implementation, the driving force suppression control is performed on the basis of the subject vehicle velocity V, and the inter-vehicle distance D between the subject vehicle 1 and the preceding vehicle. Accordingly, it is possible to prevent repeated acceleration and deceleration from decreasing the fuel consumption efficiency or the electric power consumption efficiency. According to the present implementation, if the driver clearly intends to accelerate, the driving force suppression control is cancelled. Accordingly, it is possible to improve drivability.

According to the control device for a vehicle according to the present implementation, the effectiveness ratio is gradually increased and restored to 100% for the period for which the accelerator is on, if the preceding vehicle goes away in the state in which the effectiveness ratio is lowered below 100% by the driving force suppression control. The vehicle 1 is thus prevented from accelerating more than expected by restoring the effectiveness ratio to 100% while the driver is not performing any acceleration operation, and then operating the accelerator in the same way as the driver does in the state in which the effectiveness ratio is lowered. It is thus possible to decrease the amount of fuel consumed to generate the driving force of the engine 55. It is also possible to decrease the amount of electric power consumed to generate the driving force of the motor generator 74. Further, it is possible to decrease the amount of wasted fuel or electric power by a brake operation of decelerating the vehicle 1 that is accelerated too much.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For example, in the above-described implementation, the drive control based on the effectiveness ratio reflects the effectiveness ratio in the actual accelerator opening degree Acc, but the present invention is not limited to such an example. For example, the drive controller 138 may perform the drive control by reflecting the effectiveness ratio in a parameter such as the target torque, the target rotation speed of the engine 55, or the target acceleration for deciding the driving force of the vehicle 1.

An example of the hybrid vehicle including the engine 55 and the motor generator 74 as the drive sources has been described in the above-described implementation, but the present invention is not limited to such an example. For example, even a vehicle including only a motor generator as the drive source or a vehicle including only an engine as the drive source can implement the present invention by reflecting the effectiveness ratio in the drive control.

An example in which the driver switches the control switch 30 on or off to decide whether to compute and reflect the effectiveness ratio has been described in the above-described implementation, but the present invention is not limited to such an example. For example, if the vehicle 1 is capable of performing adaptive cruise control (ACC), the vehicle 1 does not have to compute and reflect the effectiveness ratio while the adaptive cruise control is performed, but the vehicle 1 may compute and reflect the effectiveness ratio while the adaptive cruise control is not performed.

An example in which the preceding vehicle detector 112, the inter-vehicle distance detector 114, and the relative velocity computing module 116 are each configured as a module of the SC-CU 110, which processes images captured by the stereo camera assembly 20, has been described in the above-described implementation, but the present invention is not limited to such an example. For example, a preceding vehicle may be detected, or the inter-vehicle distance and the relative velocity may be acquired on the basis of information acquired through an onboard millimeter wave radar, vehicle-to-vehicle communication, and an intelligent transport system (ITS).

An example in which the SC-CU 110 includes the relative velocity computing module 116, and the HEV-CU 130 includes the standard inter-vehicle distance setting module 132, the effectiveness ratio setting module 134, the display controller 136, and the drive controller 138 has been described in the above-described implementation, but the present invention is not limited to such an example. The functions of the respective modules may be implemented by the other control units such as the ECU 50, the TCU 60, and the MCU 70 executing programs.

The steps described herein do not necessarily have to be chronologically processed in the order described as the flowcharts. For example, the steps in the drive control processing may be processed in order different from that of the flowcharts or processed in parallel.

According to the implementation of the present invention as described above, it is possible to prevent a vehicle from accelerating more than expected in response to an accelerator operation of a driver when driving force suppression is cancelled, and to prevent decrease in the energy consumption efficiency for generating the driving force of the vehicle.

The invention claimed is:

1. A control device for a vehicle, the control device comprising:
an inter-vehicle distance detector that detects a presence or an absence of a preceding vehicle, and an inter-vehicle distance between the vehicle and the preceding vehicle;
an effectiveness ratio setting module that sets an effectiveness ratio indicating a proportion of an accelerator operation amount of a driver to be reflected in a drive control, on the basis of the inter-vehicle distance and the accelerator operation amount when the inter-vehicle distance is less than a predetermined standard value; and
a drive controller that performs the drive control of an engine and a motor generator that are equipped on the vehicle on the basis of a target torque calculated based on the accelerator operation amount and the effectiveness ratio,
wherein the effectiveness ratio setting module is configured to:
set a standard inter-vehicle distance based on a velocity of the vehicle;
calculate an inter-vehicle distance difference by subtracting the standard inter-vehicle distance from the inter-vehicle distance;
set a first threshold value of the accelerator operation amount and a second threshold value of the accelerator operation amount based on the inter-vehicle distance difference, wherein the second threshold value is more than the first threshold value;
when the accelerator operation amount is the first threshold value or less, set the effectiveness ratio to a constant value responsive to the inter-vehicle distance difference and larger than 0%;
when the accelerator operation amount is the second threshold value or more, set the effectiveness ratio to 100%; and
when the accelerator operation amount is more than the first threshold value and less than the second threshold value, set the effectiveness ratio to an increased value that is set larger as the accelerator operation amount is larger, and
wherein, when the preceding vehicle goes away in a state in which the effectiveness ratio is lowered, the effectiveness ratio setting module gradually increases the effectiveness ratio for a period for which an accelerator is on.

2. The control device for the vehicle according to claim 1, wherein after the preceding vehicle goes away in the state in which the effectiveness ratio is lowered, the effectiveness ratio setting module retains the as-set effectiveness ratio for a predetermined time, and then gradually increases the effectiveness ratio.

3. The control device for the vehicle according to claim 2, wherein the predetermined standard value of the inter-vehicle distance is set in accordance with the velocity of the vehicle, and a relative velocity of the vehicle and the preceding vehicle.

4. The control device for the vehicle according to claim 2, wherein the drive controller reflects the effectiveness ratio in at least one of an actual accelerator opening degree, a target driving force, a target rotation speed of the engine, or a target acceleration, and performs the drive control.

5. The control device for the vehicle according to claim 1, wherein the drive controller reflects the effectiveness ratio in at least one of an actual accelerator opening degree, a target driving force, a target rotation speed of the engine, or a target acceleration, and performs the drive control.

6. The control device for the vehicle according to claim 1, wherein the predetermined standard value of the inter-vehicle distance is set in accordance with the velocity of the vehicle, and a relative velocity of the vehicle and the preceding vehicle.

7. The control device for the vehicle according to claim 1, wherein the increased value is set more than the constant value and less than 100%, and the increased value is set to become gradually larger as the accelerator operation amount is larger.

8. A control device for a vehicle, the control device comprising:
 circuitry configured to
  detect a presence or an absence of a preceding vehicle, and an inter-vehicle distance between the vehicle and the preceding vehicle;
  set an effectiveness ratio indicating a proportion of an accelerator operation amount of a driver to be reflected in a drive control, on the basis of the inter-vehicle distance and the accelerator operation amount when the inter-vehicle distance is less than a predetermined standard value; and
  perform the drive control of an engine and a motor generator that are equipped on the vehicle on the basis of a target torque calculated based on the accelerator operation amount and the effectiveness ratio,
 wherein
  set a standard inter-vehicle distance based on a velocity of the vehicle;
  calculate an inter-vehicle distance difference by subtracting the standard inter-vehicle distance from the inter-vehicle distance;
  set a first threshold value of the accelerator operation amount and a second threshold value of the accelerator operation amount based on the inter-vehicle distance difference, wherein the second threshold value is more than the first threshold value;
   when the accelerator operation amount is the first threshold value or less, set the effectiveness ratio to a constant value responsive to the inter-vehicle distance difference and larger than 0%;
   when the accelerator operation amount is the second threshold value or more, set the effectiveness ratio to 100%; and
   when the accelerator operation amount is more than the first threshold value and less than the second threshold value, set the effectiveness ratio to an increased value that is set larger as the accelerator operation amount is larger, and
  when the preceding vehicle goes away in a state in which the effectiveness ratio is lowered, the effectiveness ratio is gradually increased for a period for which an accelerator is on.

9. The control device for the vehicle according to claim 8, wherein the increased value is set more than the constant value and less than 100%, and the increased value is set to become gradually larger as the accelerator operation amount is larger.

* * * * *